(12) United States Patent
Nussbaum et al.

(10) Patent No.: US 10,585,502 B2
(45) Date of Patent: Mar. 10, 2020

(54) TOUCH SENSOR EXCITATION USING TRANSFORMER

(71) Applicant: Apple Inc., Cupertino, CA (US)

(72) Inventors: Michael Nussbaum, Santa Cruz, CA (US); Blake R. Marshall, San Jose, CA (US); Jason P. Marini, Morgan Hill, CA (US); Li-Quan Tan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 15/680,088

(22) Filed: Aug. 17, 2017

(65) Prior Publication Data

US 2019/0056803 A1 Feb. 21, 2019

(51) Int. Cl.
| | |
|---|---|
| *G06F 3/03* | (2006.01) |
| *G06F 3/044* | (2006.01) |
| *G06F 1/32* | (2019.01) |
| *G06F 3/038* | (2013.01) |
| *G06F 3/0354* | (2013.01) |

(Continued)

(52) U.S. Cl.
CPC .......... *G06F 3/0383* (2013.01); *G06F 1/3259* (2013.01); *G06F 3/03545* (2013.01); *G06F 3/044* (2013.01); *G06F 3/0416* (2013.01); *G06F 2203/04106* (2013.01); *G06F 2203/04108* (2013.01)

(58) Field of Classification Search
CPC .................. G06F 3/0383; G06F 3/0416; G06F 3/03545–0488
See application file for complete search history.

(56) References Cited

U.S. PATENT DOCUMENTS

| | | | |
|---|---|---|---|
| 4,227,044 A * | 10/1980 | Fencl | G06F 3/0383 178/19.03 |
| 5,483,261 A | 1/1996 | Yasutake | |
| 5,488,204 A | 1/1996 | Mead et al. | |

(Continued)

FOREIGN PATENT DOCUMENTS

| | | | |
|---|---|---|---|
| EP | 2 466 431 A1 | 6/2012 | |
| GB | 302190 A * | 12/1928 | G11B 3/31 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Lin Li
(74) *Attorney, Agent, or Firm* — Kubota & Basol LLP

(57) ABSTRACT

Input device power consumption can be reduced with a magnetic drive system. In some examples, the input device can include a transformer configured to generate a desired high output voltage from logic-level input pulses. In some examples, the distributed capacitance and associated resonance of the transformer can act as a low-pass filter, and can create a relatively clean output waveform from input logic signal waveforms. In some examples, the transformer can be an autotransformer. In some examples, to stabilize an amplitude of the output by sampling the output of the transformer and adjusting the input to the transformer based on the sampled output.

20 Claims, 12 Drawing Sheets

(51) Int. Cl.
  *G06F 1/3234* (2019.01)
  *G06F 3/041* (2006.01)

(56) References Cited

U.S. PATENT DOCUMENTS

| | | | |
|---|---|---|---|
| 5,825,352 | A | 10/1998 | Bisset et al. |
| 5,828,011 | A * | 10/1998 | Partow ................ G06F 3/03545 178/19.01 |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,199,132 | B1 | 6/2012 | Oda et al. |
| 8,479,122 | B2 | 7/2013 | Hotelling et al. |
| 9,035,919 | B2 | 5/2015 | Cooke |
| 9,176,630 | B2 | 11/2015 | Westhues et al. |
| 9,519,363 | B2 | 12/2016 | Mann |
| 9,927,889 | B2 * | 3/2018 | Oda ..................... G06F 3/03545 |
| 10,216,330 | B2 * | 2/2019 | Vavra ................... G06F 3/0488 |
| 2006/0197753 | A1 | 9/2006 | Hotelling |
| 2010/0315384 | A1 | 12/2010 | Hargreaves et al. |
| 2011/0155479 | A1 | 6/2011 | Oda et al. |
| 2012/0146958 | A1 * | 6/2012 | Oda ..................... G06F 3/03545 345/179 |
| 2014/0347311 | A1 * | 11/2014 | Joharapurkar .......... G06F 3/044 345/174 |
| 2015/0193025 | A1 * | 7/2015 | Rebeschi ............ G06F 3/03545 345/174 |
| 2017/0102789 | A1 * | 4/2017 | Oda ...................... G06F 3/0416 |
| 2017/0228049 | A1 * | 8/2017 | Yamamoto ............. G06F 3/038 |
| 2017/0255281 | A1 * | 9/2017 | Gordon ................... G06F 3/044 |
| 2017/0285772 | A1 * | 10/2017 | Yamamoto ............. G06F 3/044 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Singer, N. C. et al. (Jan. 1988). "Preshaping Command Inputs to Reduce System Vibration," Massachusetts Institute of Technology, A.I. Memo No. 1027, 28 pages.

Turnbull, F. G. (1963). "Selected Harmonic Reduction in Static D-C-A-C Inverters," IEEE, Toronto, Canada, five pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

FREQUENCY

FREQUENCY

TOUCH SENSOR EXCITATION USING TRANSFORMER

FIELD

This relates generally to input devices for use with touch-sensitive devices and, more specifically, a stylus input device using a transformer for excitation of a touch sensor.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. However, generating stimulation signals in an active stylus that can be sensed by the touch-sensitive device can require significant power resources.

SUMMARY

This relates to an input device (e.g., an active stylus) with a magnetic drive system to reduce power consumption. In some examples, an active stylus can include a transformer configured to generate a desired high output voltage from logic-level input pulses. In some examples, the distributed capacitance and associated resonance of the transformer can act as a low-pass filter, and can create a relatively clean output waveform from input logic signal waveforms. In some examples, the transformer can be an autotransformer. In some examples, to stabilize an amplitude of the output by sampling the output of the transformer and adjusting the input to the transformer based on the sampled output.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to an input device (e.g., an active stylus) with a magnetic drive system to reduce power consumption. In some examples, an active stylus can include a transformer configured to generate a desired high output voltage from logic-level input pulses. In some examples, the distributed capacitance and associated resonance of the transformer can act as a low-pass filter, and can create a relatively clean output waveform from input logic signal waveforms. In some examples, the transformer can be an autotransformer. In some examples, to stabilize an amplitude of the output by sampling the output of the transformer and adjusting the input to the transformer based on the sampled output.

Figure 1A:
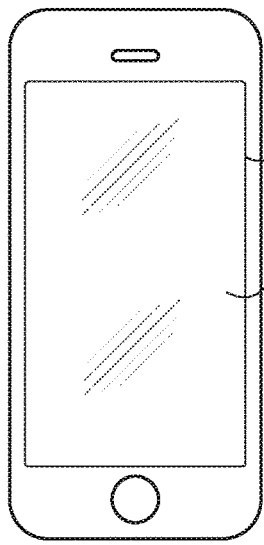
FIGS. 1A-1E illustrate examples of systems with touch screens that can accept input from an active stylus according to examples of the disclosure.
Figure 1B:
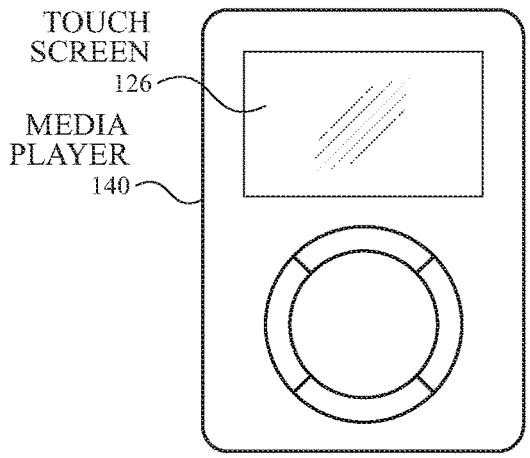
Figure 1C:
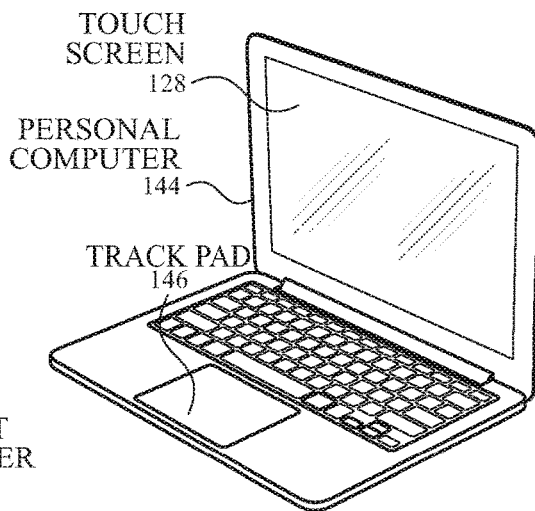
Figure 1D:
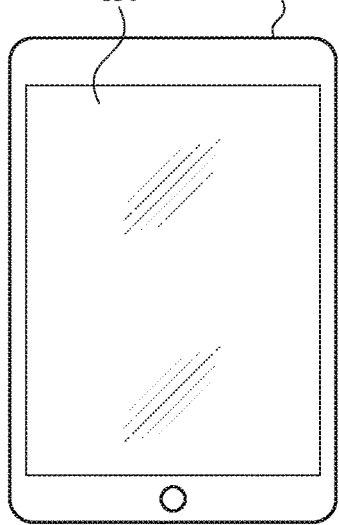
Figure 1E:
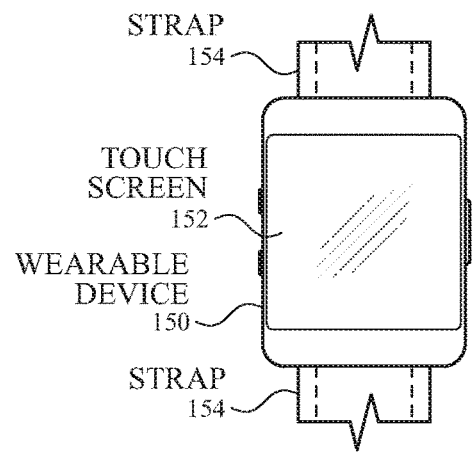

FIGS. 1A-1E illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. FIG. 1D illustrates an example tablet computing device 148 that includes a touch screen 130 that can accept input from an active stylus according to examples of the disclosure. Other devices, including wearable devices, can accept input from an active stylus according to examples of the disclosure. FIG. 1E illustrates an example wearable device 150 (e.g., a watch) that includes a touch screen 152 that can accept input from an active stylus according to examples of the disclosure. Wearable device 150 can be coupled to a user via strap 154 or any other suitable fastener. It should be understood that the example devices illustrated in FIGS. 1A-1E are provided by way of example, and other types of devices can include a touch screen that can accept input from an active stylus. Additionally, although the devices illustrated in FIGS. 1A-1E include touch screens, in some examples, the devices may have a non-touch-sensitive display, and include other touch-sensitive surfaces that can accept input from an active stylus. For example, Personal computer 144 can include track pad 146 that can accept input from an active stylus.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
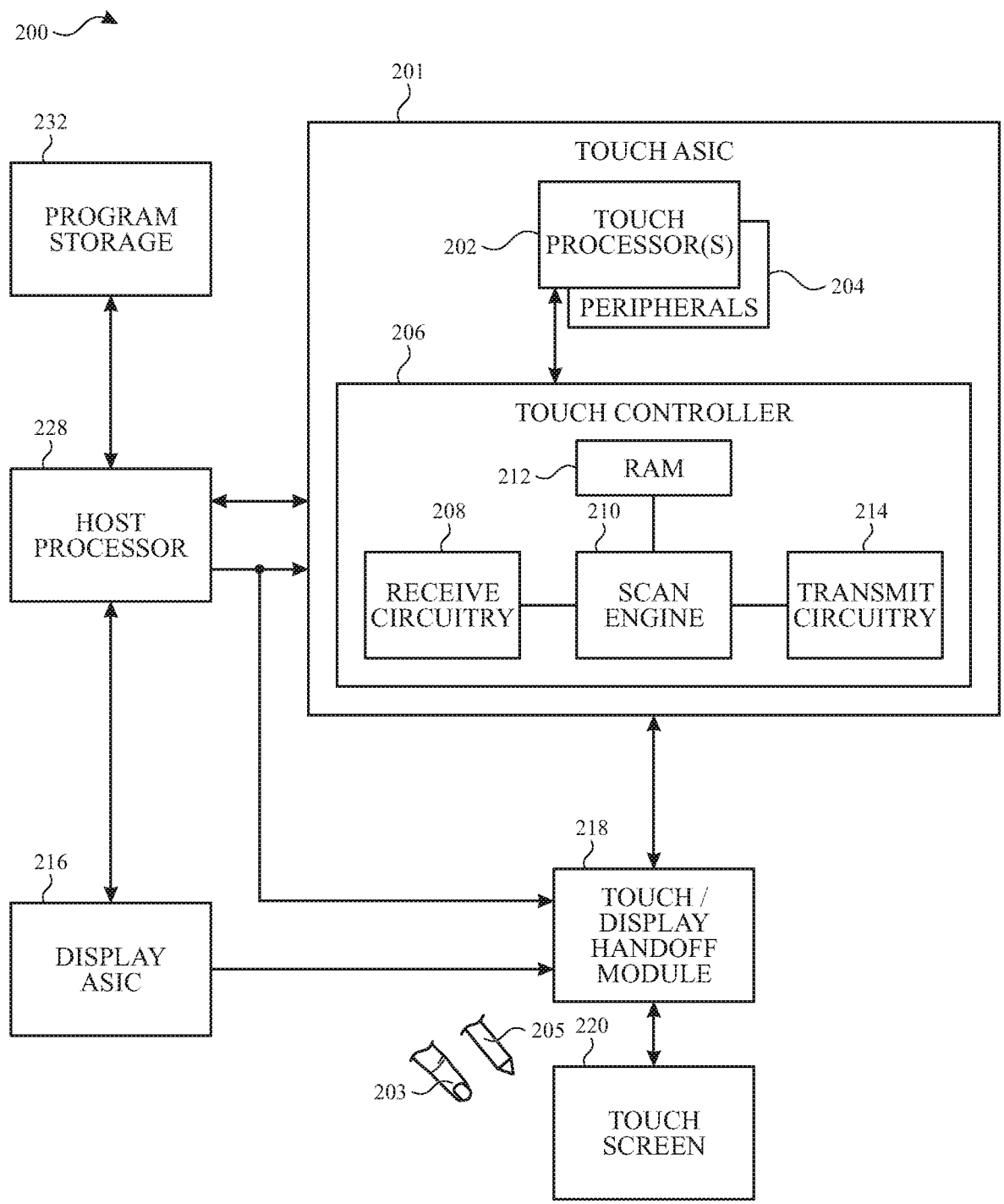
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
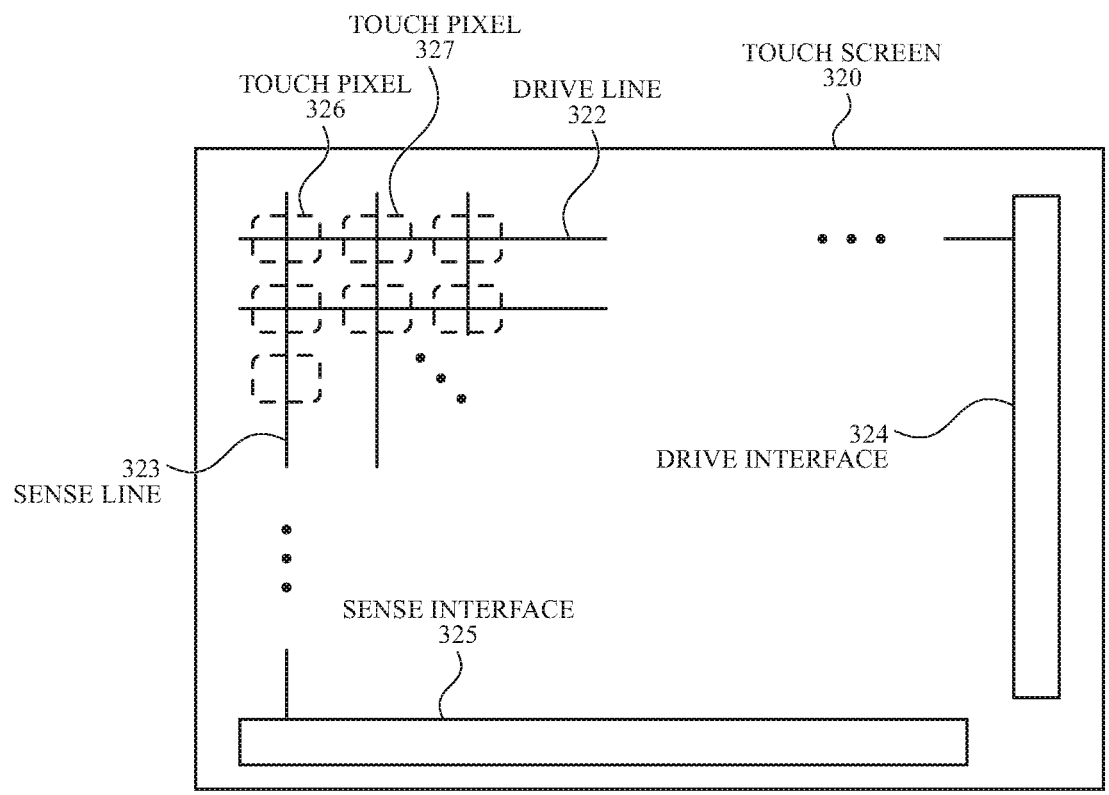
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
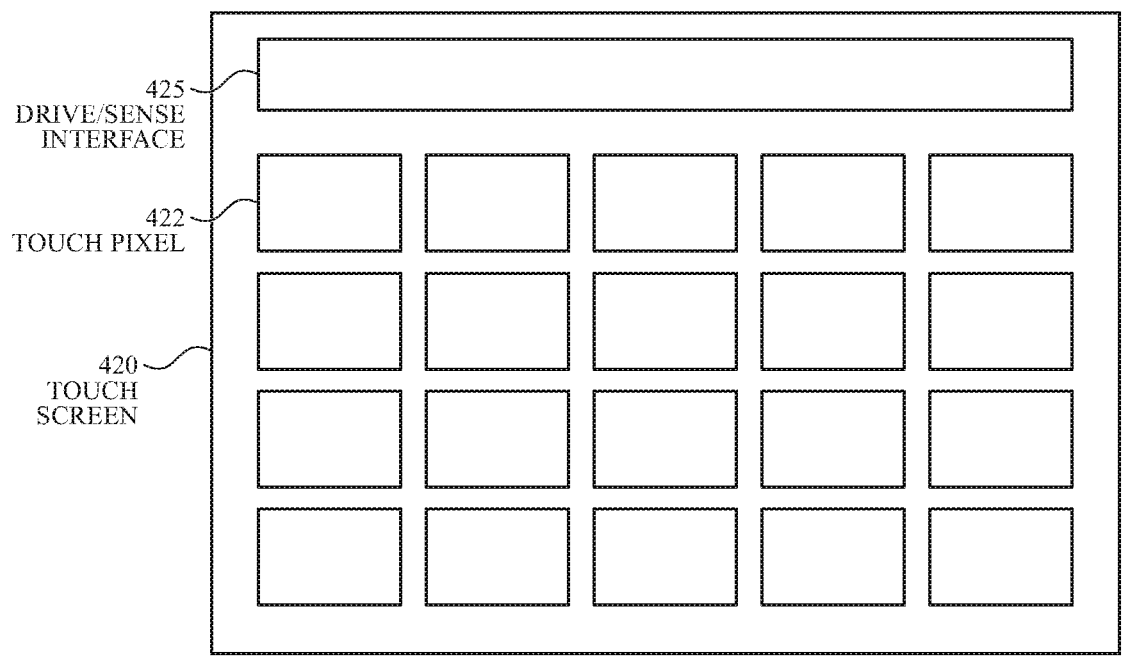
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

As described herein, in addition to performing touch scans to detect an object such as a finger or a passive stylus, computing system 200 can also perform stylus scans to detect an active stylus and can communicate with a stylus. For example, an active stylus can be used as an input device on the surface of a touch screen of touch-sensitive device.

Figure 5:
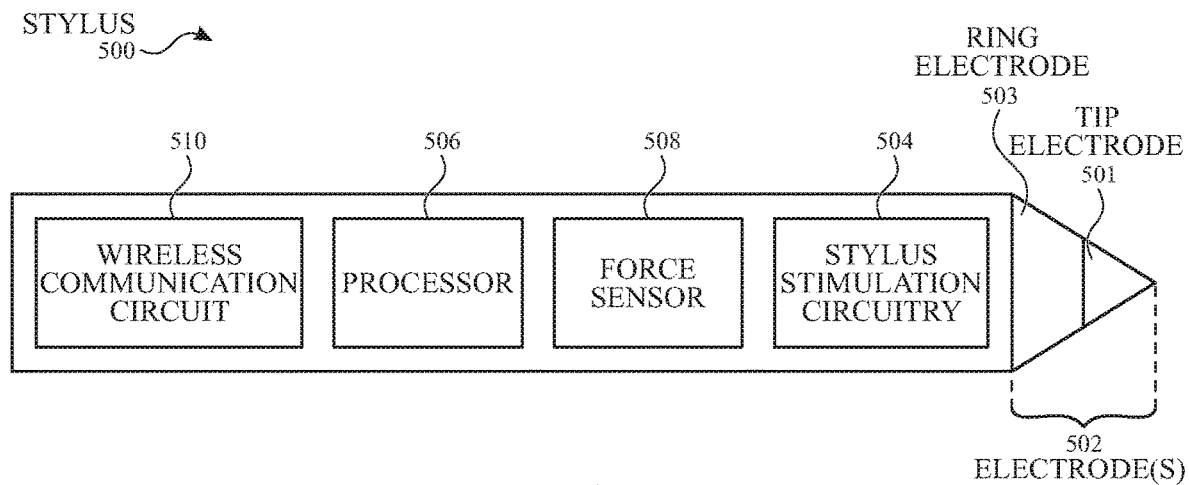
FIG. 5 illustrates an example active stylus according to examples of the disclosure.

FIG. 5 illustrates an example active stylus according to examples of the disclosure. Stylus 500 can include one or more electrodes 502, which can be located, for example, at a distal end of the stylus (e.g., the tip end of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220. As described in more detail herein, the stylus stimulation circuitry can include a magnetic component (e.g., a transformer) to generate the desired high voltage output (e.g., in the range of 20V-80V) using standard logic level voltages (e.g., 1.5-5V).

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. As described herein in more detail, in some examples, processor 506 or a processor in the stylus stimulation circuitry 504 can be used to generate the stylus stimulation signals and to stabilize the output voltage of the stylus stimulation signals. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in a memory (not shown)) and/or transmitted (via a wired connection or wirelessly) to the computing system 200. For example, the force information can be communicated to host processor 228 or touch ASIC 201 in computing system 200. Force information and corresponding location information can be processed together by host processor 228 and/or touch ASIC 201.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the force information from the stylus 500 to the wireless communication circuitry of computing system 200. The wireless communication circuit 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals at electrodes 502 based on, or at, the one or more low noise frequencies. In some examples, the stylus stimulation circuitry 504 can generate stimulation signals at two or more different frequencies (e.g., at one frequency at the ring electrode and at a second frequency at the tip electrode), though in other examples, stimulation signals are only generated by the stylus at one frequency. In some examples, information, such as information about stylus stimulation frequencies and scan event plans, can be transmitted from touch ASIC 201 to the wireless communication unit of computing system 200 via host processor 228. In other examples, information, such as clock synchronization information, can be communicated directly from touch ASIC 201 to wireless communication unit of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
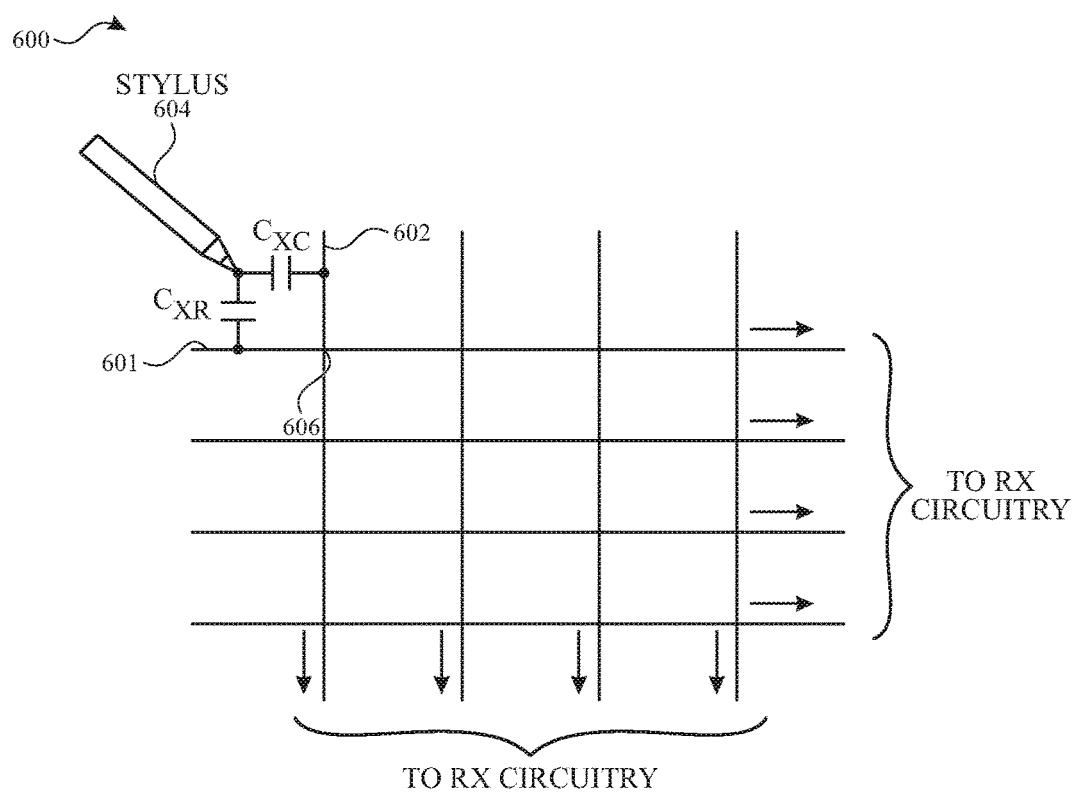
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit circuitry 214 can be disabled, i.e., no stimulation signals Vstim from the touch controller are sent to touch sensor panel 600. The capacitive coupling (e.g., mutual capacitance) can be received by the receive circuitry 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive circuitry and/or transmit circuitry. For example, during a mutual capacitance touch sensing scan, row traces can be coupled to the transmit circuitry and column traces can be coupled to the receive circuitry. During a stylus sensing scan, column traces (or row traces) can be coupled via the one or more multiplexers to the receive circuitry to detect input from a stylus or other input device along one axis of the touch screen, and then the row traces (or column traces) can be coupled via the one or more multiplexers to the receive circuitry to detect input from a stylus or other input device along a second axis of the touch screen. In some examples, the row and column traces can be sensed simultaneously (i.e., both row and column traces concurrently coupled to the receive circuitry). In some examples, the stylus can be detected on the column traces concurrently with the mutual capacitance scan touch sensing scan. The touch and stylus signals can be differentiated by filtering and demodulating the received response signals at different frequencies.

Figure 7:
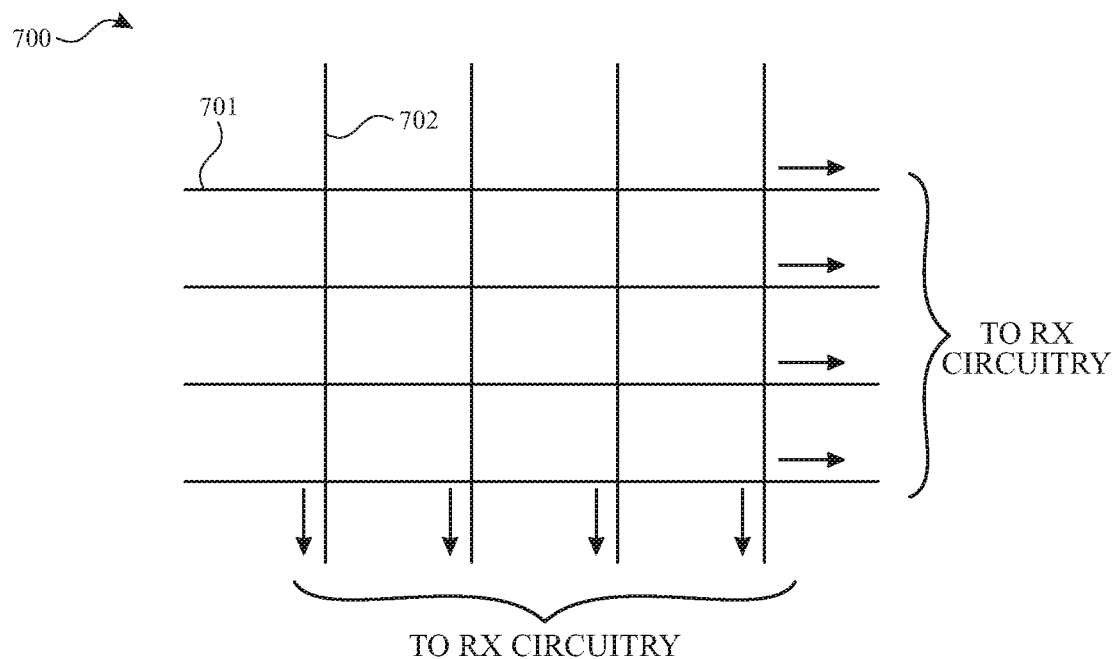
FIG. 7 illustrates an example touch sensor panel configuration operable with the touch ASIC of FIG. 2 to perform a stylus spectral analysis scan according to examples of the disclosure.

FIG. 7 illustrates an example touch sensor panel configuration operable with the touch ASIC of FIG. 2 to perform a stylus spectral analysis scan according to examples of the disclosure. During a stylus spectral analysis scan or a touch spectral analysis scan, the transmit circuitry 214 can be disabled, i.e., no stimulation signals Vstim are sent to touch sensor panel 700, while some or all of the row traces 701 and column traces 702 can be coupled to the receive circuitry 208. The receive circuitry 208 can receive and process touch signals from some or all of the rows and columns of the touch sensor panel 700 in order to determine one or more low noise frequencies for use during subsequent touch and/or stylus scans.

When the stylus 500 first connects or reconnects wirelessly to the computing system 200 it can receive frequency information from the computing system 200. A stylus spectral analysis scan can determine one or more clean frequencies for the stylus to use to generate one or more stimulation signals. The computing system 200 and stylus 500 can communicate (including, for example, performing a handshake between the two devices) and computing system 200 can transmit the frequency information to the stylus 500 such that the stylus knows the appropriate one or more frequencies to use to generate one or more stimulation signals.

The stylus 500 can change at least one stimulation frequency as a result of a stylus spectral analysis scan. In a synchronous system, a stylus spectral analysis scan can execute while the stylus 500 is predicted to not be generating a stimulation signal, e.g., when a stylus scan is not executing. After completing the stylus spectral analysis scan, the frequency information can be communicated wirelessly to stylus 500 and the communication can cause the stylus 500 to change the one or more stimulation frequencies. The computing system 200 can then switch the one or more frequencies used for demodulating stylus scan events when the stylus 500 has switched frequencies.

In other examples, stylus 500 can be asynchronous such that the stylus 500 can generate one or more stimulation signals at one or more stimulation frequencies irrespective of the timing of the stylus scan event. As a result, the stylus 500 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 200 can assume that stylus lift-off will eventually occur and wait until lift-off to initiate a stylus spectral analysis scan. The computing system 200 can predict a lift-off condition using the results of other scans, e.g., stylus scans, or stylus force information to predict that the stylus is not on the panel, and then perform a stylus spectral analysis scan.

Generating stimulation signals at one or more stylus electrodes to excite one or more touch nodes of a touch sensor panel can require significant power. For example, conventional active styli may use a boost regulator and a CMOS switch or linear amplifier to directly drive the capacitive output load seen by an active stylus exciting a capacitive touch sensor panel. In some cases, power efficiency of such drive systems can be marginally improved by using a stimulation signal generated by switching between discrete voltage levels including intermediate voltage levels as described in U.S. patent application Ser. No. 14/751,057 filed Jun. 25, 2015 (Shahrooz SHAHPARNIA et al.), the disclosure of which is herein incorporated by reference in its entirety for all intended purposes. However, such drive systems still require boost regulators and operating stimulation circuitry at relatively high voltage. Given stylus requirements (e.g., size, weight, etc.), performance of a powered stylus (e.g., a battery powered stylus) can be improved by improving the power efficiency of the active stylus drive system for generating stimulation signals. For example, battery life could be extended by a more power efficient drive system, thereby improving the user experience (e.g., less frequent charging). Additionally or alternatively, battery size can be reduced.

Figure 8A:
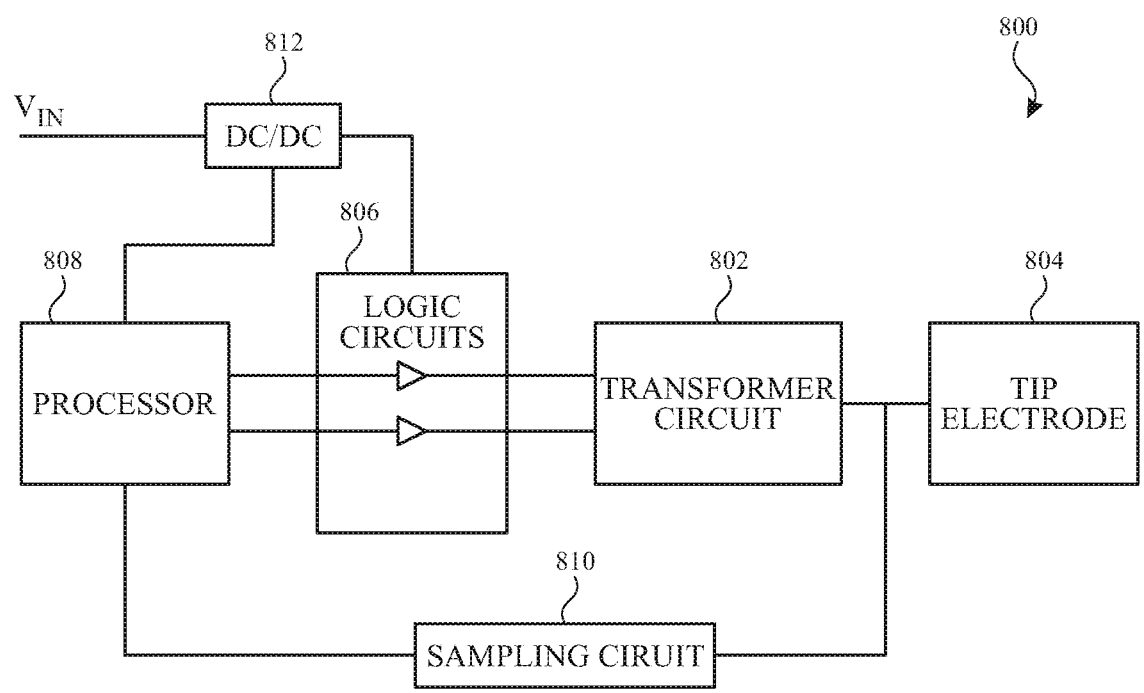
FIGS. 8A-8B illustrate a block diagrams of a magnetic drive system according to examples of the disclosure.

In some examples, a magnetic drive system can be used to improve power efficiency and reduce power consumption. Some of these power benefits can come from omitting the booster regulator circuitry and/or from operating the drive system using lower voltage circuitry. The output voltage requirements can be achieved using a magnetic component (e.g., a transformer). Additionally, a magnetic drive system can also extend power efficiency across a larger range of higher frequencies than can be achieved without a magnetic drive system. Drive systems without a magnetic component tend to see increases in power consumption as frequency increases. FIG. 8A illustrates a block diagram of a magnetic drive system 800 according to examples of the disclosure. Most of the components of magnetic drive system 800 can correspond to and be implemented as part of stylus stimulation circuitry 504 of FIG. 5. Magnetic drive system 800 can include a transformer circuit 802 as the magnetic component. The output of transformer circuit 802 can be coupled to an electrode (e.g., tip electrode 804) of the active stylus. The magnetic drive system can include one or more logic circuits 806 configured to generate one or more logic signals. The one or more logic signals can be supplied from the logic circuits 806 to the transformer circuit 802 (e.g., via the primary winding or on the primary side). Logic circuits 806 can be I/O driver logic configured, in some examples, to operate at standard logic levels (e.g., 1.5V, 1.8V, 2.5V, 3.3V, 5V, etc.). The standard voltage level selected for the one or more logic signals can be determined, for example, as a function of the desired output voltage amplitude from the transformer circuit and characteristics of the transformer circuit (e.g., type, amplification characteristics, etc.). The supply rails for the logic circuits 806 can be provided by a voltage regulator 812, which can be a direct current to direct current (DC/DC) converter. The input voltage for voltage regulator 812 can, for example, come from the stylus power supply (e.g., a battery) (not shown). Logic circuits 806 can generate the one or more logic signals based on stimulation waveforms provided by processor 808. The stimulation waveforms provided by the processor can be stored in memory (not shown) in the stylus. In some examples, the stimulation waveforms can be programmed in memory within the stylus. In some examples, the stimulation waveforms can be reprogrammed based on stimulation waveforms received from a device in communication with the stylus. However, it should be understood, that the stimulation waveforms can be generated by the stylus without receiving a stimulation waveform from the touch-sensitive device. Referring back to FIG. 5, processor 808 can correspond to processor 506 and/or to a separate processor in stylus stimulation circuitry 504.

Magnetic drive system 800 can also include circuitry to stabilize amplitude of the output voltage of the stimulation signal applied to an electrode. The output of transformer circuit 802 can experience drift due to changes in environmental conditions (e.g., temperature, humidity), age of components, and frequency of operation, which can degrade stylus sensing performance. Frequency, age and environmental conditionals can affect the gain characteristics of the transformer and therefore the output amplitude. The stabilizing circuitry can include a processor 808 and a sampling circuit 810. Sampling circuit 810 can sample the output of transformer circuit 802 and processor 808 can adjust the logic signals applied to the transformer circuit 802 to account for the drift of the output. In some examples, the sampling circuit 810 can include an analog-to-digital converter (ADC). In some examples, the sampling circuit 810 can further include a DC-AC converter circuit between the output of transformer circuit 802 and the ADC. Processor 808 can receive one or more samples from the sampling circuit 810 and adjust the logic signals based on the one or more samples. In some examples, processor 808 can adjust the output of voltage regulator 812, which can be supplied as the supply rail for logic circuits 806. In such systems, the processor 808 and the sampling circuit 810 can close a servo loop to control voltage regulator 812 and stabilize the output stimulation signal. Additionally, in some examples, decay on the voltage rail can be mitigated by adding a capacitor on the supply voltage rail. In some examples, processor 808, can adjust the pulse width of the logic signals by adjusting the stimulation waveforms provided by processor 808 to logic circuits 806. In some examples, processor 808 can adjust both the voltage supply rails and the pulse width of the logic signals.

Figure 8B:
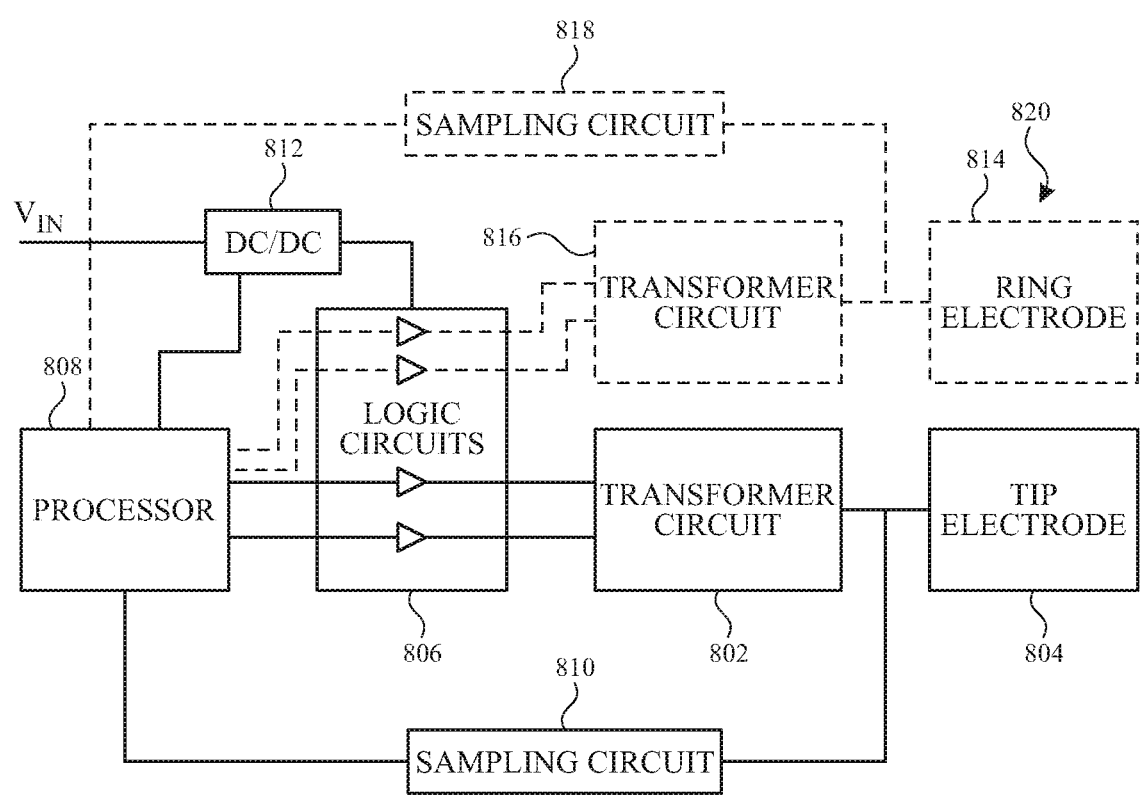

In some examples, the various components of the stylus stimulation circuitry illustrated in FIG. 8A can be implemented on a single circuit board and/or in a single ASIC. In some examples, the various components can be distributed across one or more circuits and distributed across multiple circuit boards. Although FIG. 8A illustrates a block diagram 800 of a magnetic drive system for stimulating one electrode, the magnetic drive system can be adapted to provide stimulation signals to multiple electrodes of an input device. For example, as illustrated in FIG. 8B, in an active stylus with a tip electrode 804 and a ring electrode 814 (e.g., as illustrated in FIG. 5), the drive system 820 can include a separate transformer circuit 816 (and accompanying logic circuitry 806/sampling circuitry 818) coupled to the ring electrode. In some examples, the drive system circuitry can be shared between the multiple electrodes using a time-multiplexing scheme. In such examples, a switching circuit can be added between the transformer circuit and the multiple electrodes to allow for sharing of the stylus stimulation circuitry between multiple electrodes. During stimulation of the tip electrode for example, the output of the transformer circuit can be coupled to the tip electrode by the switching circuitry; during stimulation of the ring electrode, for example, the output of the transformer circuit can be coupled to the ring electrode by the switching circuitry.

Figure 9A:
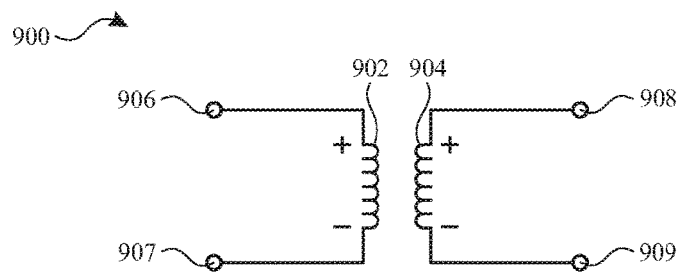
FIGS. 9A-9D illustrate exemplary transformer circuits according to examples of the disclosure.

FIGS. 9A-9D illustrate exemplary transformer circuits according to examples of the disclosure. FIG. 9A illustrates an exemplary two-winding transformer 900 including a separate primary winding 902 and secondary winding 904. In some examples, a logic signal from the one or more logic circuits 806 can be applied to a first terminal 906 (e.g., positive terminal) of the primary winding 902 and the second terminal 907 can be grounded. The ground-referenced logic signal applied to the primary winding 902 can induce a stimulation signal in the secondary winding 904. The output of the secondary winding 904 from a first terminal 908 (e.g., positive terminal) of the secondary winding 904 can be applied to the electrode (e.g., tip electrode 804). The second terminal 909 of the secondary winding 904 can be grounded. The output of the secondary winding 904 applied to the electrode (i.e., the stimulation signal) can be a stepped up version of the logic signal applied to the primary winding 902, with the step up determined based on characteristics of the transformer 900 (e.g., the turns ratio and gain due to self-resonance).

Figure 9B:
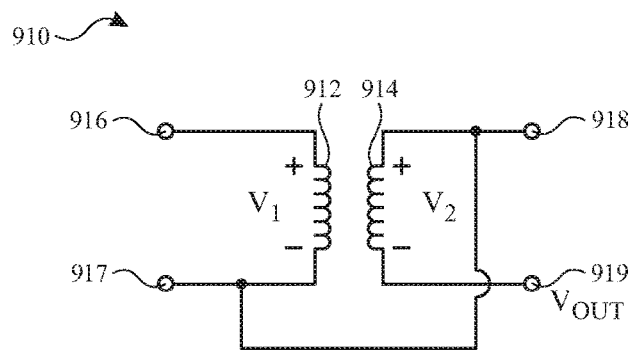
Figure 9C:
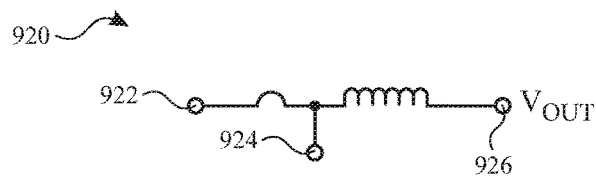

FIGS. 9B and 9C illustrate exemplary autotransformers 910 and 920 according to examples of the disclosure. Autotransformer 910 can be implemented, in some examples, by wiring a two-winding transformer, such that the second terminal 917 of the primary winding 912 and the first terminal 918 of the secondary winding 914 are tied together. In some examples, a logic signal from the one or more logic circuits 806 can be applied to the first terminal 916 (positive terminal) of the primary winding 912 and the second terminal 917 (negative terminal) of the primary winding 912 can be grounded. The output of the autotransformer 910 can be taken from the second terminal 919 (negative terminal) an applied to the electrode. The signal applied across the primary winding 912 can induce a signal across the secondary winding 914 as well (e.g., amplified based on the turn ratio between the two windings). The output of the autotransformer 910 can be expressed mathematically as $V_o=V_1+V_2$, where $V_o$ can represent the output of the autotransformer applied to the electrode, $V_1$ can represent the voltage across the primary winding 912 of the autotransformer and $V_2$ can represent the voltage across the secondary winding 914 of the autotransformer. In some examples, rather than applying a ground referenced logic signal to the primary winding 912, two logic signals can be applied to the primary winding 912 of the transformer. For example, a first logic signal can be applied to a first terminal 916 of the primary winding 912 and a second logic signal can be applied to a second terminal 917 of the primary winding 912. The signal applied across the primary winding 912 can be a superposition of the two logic signals. The use of two logic signals to generate the transformer input can increase the overall amplitude while still using standard logic voltage levels and provide three voltage levels for the generation of the transformer input.

In some examples, rather than implementing autotransformer 910 with separate primary and secondary windings 912 and 914, autotransformer 920, as illustrated in FIG. 9C, can be implemented with a single winding. Autotransformer 920 includes a single, partially shared winding, and a portion of the single winding acts as both the primary and secondary sides of the transformer. As described above with respect to FIG. 9B, one or more logic signals can be applied to input taps 922 and 924 of autotransformer 920 (corresponding to the primary side), and the output can be taken from the third tap 926 of the autotransformer 920.

Figure 9D:
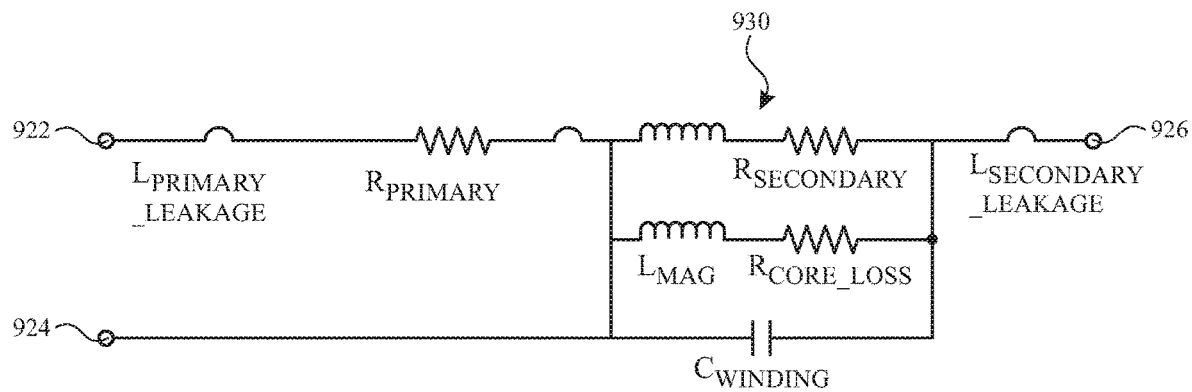

The design of the transformer circuit 802 can be critical to achieving power efficient magnetic drive system. The design can take into account a number of factors including core loss, self-resonance, manufacturing costs and yield, primary to secondary coupling (and associated leakage inductance), turns ratio, and copper losses. A number of these design considerations are described below in more detail, some in the context of parasitic circuit elements. FIG. 9D illustrates an exemplary circuit diagram of transformer 930 including some major parasitic elements according to examples of the disclosure. Transformer 930 can correspond to transformer 920 with major parasitic elements added. In particular, transformer 930 illustrated in FIG. 9D includes a magnetization inductance, $L_{mag}$, in series with a core loss resistance, $R_{coreloss}$, that can be representative of core loss. Transformer 930 can also include primary and secondary winding resistances, $R_{primary}$ and $R_{secondary}$, primary and secondary leakage inductance, $L_{primary\_leakage}$ and $L_{secondary\_leakage}$, and distributed winding capacitance, $C_{winding}$. It should be understood that the representation of transformer 930 is representative, but the system can be more complex and a number of the components can be frequency dependent.

In some examples, core loss can be a primary design consideration. Core loss can be a function of the transformer material and the operating flux density. The operating flux density, expressed mathematically in equation (1), can be a function of the output voltage, operating frequency, number of turns and the magnetic core cross-sectional area:

$$B_{amplitude} = \frac{1}{2}\frac{\frac{V_{peak}}{f\pi}}{NA_e} \qquad (1)$$

where $B_{amplitude}$ can represent the operating flux density, $V_{peak}$ can represent the voltage amplitude across the winding, f can represent the frequency of operation of the stylus, N can represent the number of turns and $A_e$ can represent the cross-sectional area of the magnetic core. The core loss can be approximated as a function of constants of a specific material for the transformer, as represented in equation (2):

$$\text{Core Loss}=aB_{amplitude}^{b}f^c \qquad (2)$$

where a, b and c are constants associated with specific materials. In some examples, core loss can be represented as a resistive quantity where core loss can be represent mathematically based on the loss tangent, as represented in equation (3):

$$R_{coreless}=\tan \delta \omega L_{mag} \qquad (3)$$

where $R_{coreloss}$ can represent the core loss resistance (as shown in FIG. 9D, for example), tan δ can represent the loss tangent, ω can represent the frequency and $L_{mag}$ can represent the magnetization inductance (as shown in FIG. 9D, for example).

Figure 10A:
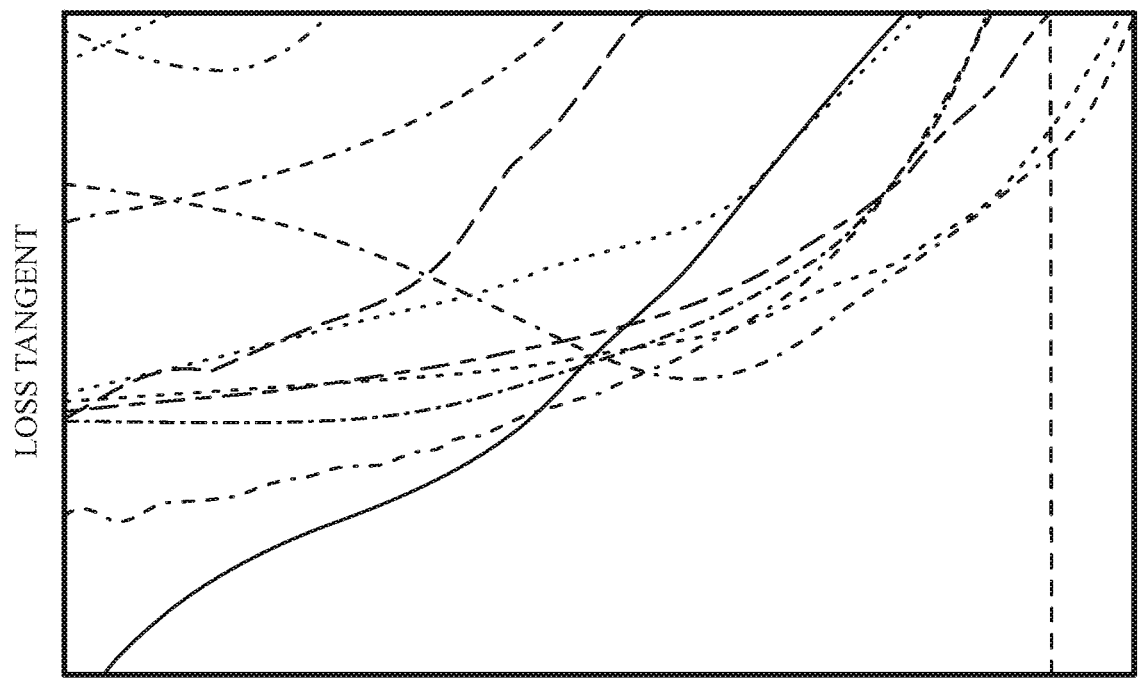
FIGS. 10A and 10B illustrate exemplary plots of magnetic material properties and transformer properties according to examples of the disclosure.

FIG. 10A illustrates an exemplary plot of magnetic material loss tangent versus frequency according to examples of the disclosure. Each curve illustrated in FIG. 10A shows the loss tangent of various ferrite materials across a range of frequencies. To reduce core losses and improve power efficiency, a ferrite material can be selected from among the various ferrite materials that demonstrate low loss tangents (below a threshold) at a frequency of interest or across a frequency range of interest. To minimize core losses, for example, a ferrite material can be selected having the lowest loss tangent at a frequency of interest or across a frequency range of interest. The ferrite material can, for example, be manganese-zinc (MnZn) or nickel-zinc (NiZn). In some examples, the ferrite material can be strontium ferrite, barium ferrite or cobalt ferrite. It should be understood that these materials are exemplary, and any suitable ferrite material can be used.

In some examples, transformer self-resonance can be an important design consideration. At the transformer resonant frequency, for example, transformer gain can be increased, which can result in high primary side current and associated losses as the frequency of the applied input waveform approaches the resonant frequency. Above the resonant frequency, the transformer can operate as a second order filter that can attenuate higher order harmonics of the input waveform. The transformer can be designed to be a low-pass filter to filter out high frequency harmonics above the resonance.

Figure 10B:
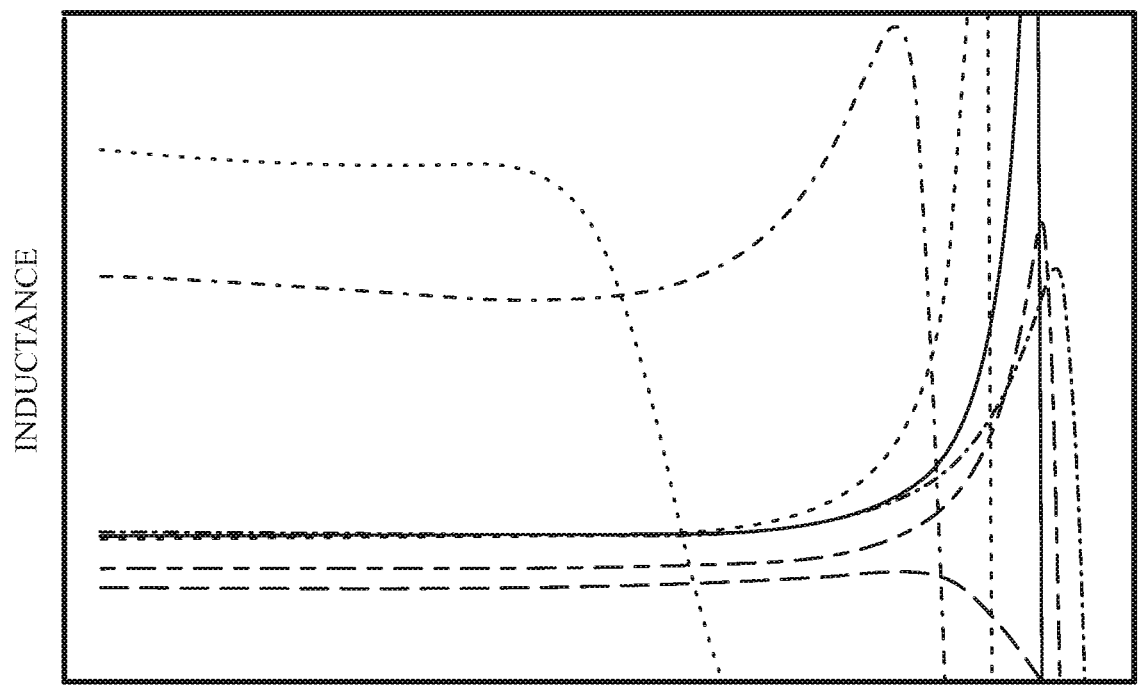

For simplicity, the self-resonance of the transformer can be represented by the winding capacitance and winding inductance ($C_{winding}$ and $L_{mag}$ in FIG. 9D), but the actual self-resonance can be more complicated due to the distributed capacitance of the winding and the frequency dependence of the magnetic inductance. As the number of turns of the transformer increases, the self-resonant frequency can decrease and the winding capacitance increases. Thus, the number of turn can become a trade-off between the transformer resonance point, which can be extended into higher frequencies by decreasing the number of turns, and the core loss, which can decrease as the number of turns increases. FIG. 10B illustrates an exemplary plot of transformer inductance versus frequency according to examples of the disclosure. Each curve illustrated in FIG. 10B shows the inductance measured across the primary side of various transformers (e.g., using an LCR meter). The self-resonant frequencies can be represented by peaks in the apparent inductance. The number of turns can be tuned to achieve the desired tradeoff for resonance (to allow for stimulation at the desired frequency or range of frequencies) and core loss (to reduce power consumption).

Additionally, manufacturability can also be an important design consideration. For example, to fit one or more transformers into a stylus can require a reduced size transformer package. Although the second side winding can be made as fine as possible (due to negligible copper loss in the secondary), there are production limits on how fine the secondary side winding can be. Additionally, there are production limitations on the material used. For example, package size can be reduced by plating electrodes on the ferrite material and winding directly on the cores without the use of a separate bobbin. However, such plating and winding can require high resistivity ferrite (e.g., NiZn), but such ferrites may have high core loss characteristics in the frequency range of operation for the active stylus.

Although the above design considerations can be relevant for both single-winding and two winding transformers, a single winding autotransformer can provide a number advantages over a two winding transformer in some examples. In particular, a single winding autotransformer can be implemented in a smaller package that can be a desirable given the size constraints of a stylus. Additionally, the single winding autotransformer can achieve the amplification required for an active stylus a smaller turns ratio than a two winding transformer because the primary voltage can be added to the output. For example, an autotransformer may achieve the same output voltage with a 1:6 turns ratio, whereas a 1:7 turns ratio may be required for a two winding transformer. Reducing the turns ratio can be beneficially because it can reduce the capacitance across the transformer, which can contribute to wasted power dissipation within the transformer (core loss). Additionally, an autotransformer's leakage inductance ($L_{primary\_leakage}$ and $L_{secondary\_leakage}$ in FIG. 9D) due to imperfect coupling between the primary and secondary sides of the transformer can be used to decouple the input driver from the distributed output capacitance ($C_{winding}$ in FIG. 9D). The inductance between the output of the logic drivers and the transformer distributed capacitance can mitigate or reduce loss in the drivers, thereby increasing the efficiency of the magnetic drive system.

Figure 11A:
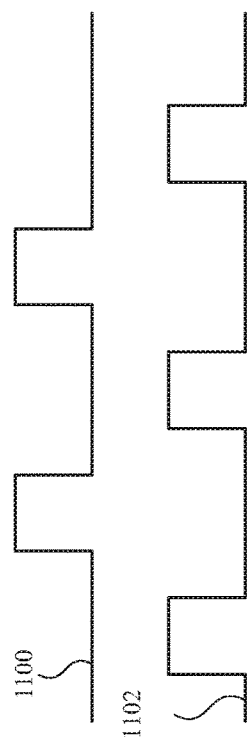
FIGS. 11A-11B illustrate exemplary logic signals and composite signals according to examples of the disclosure.
Figure 11B:
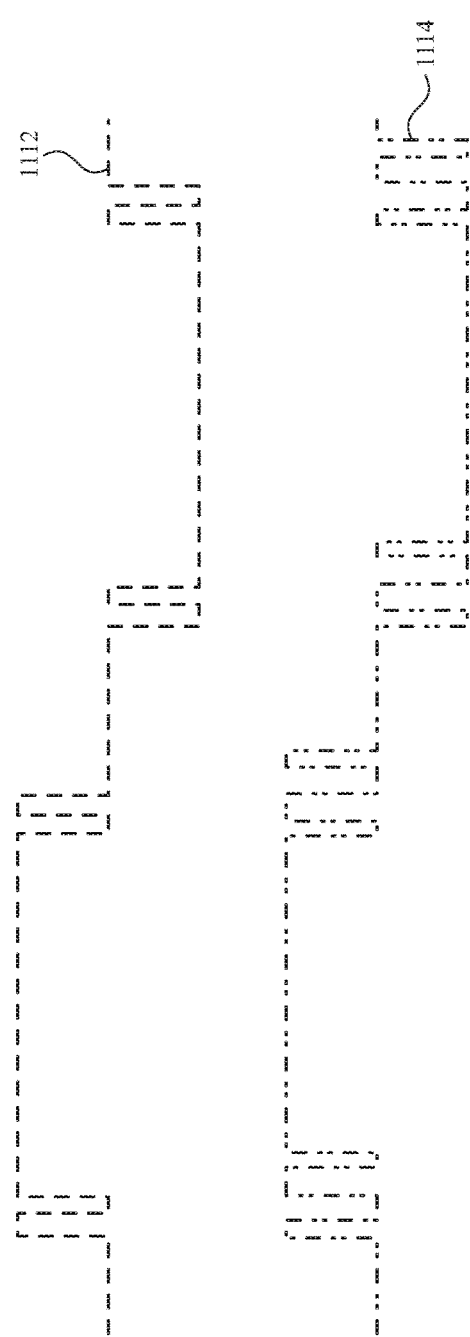

As described above, in some examples, taps of the autotransformer can be provided with two logic signals. For examples, logic circuits 806 can output two logic signals with standard logic levels (e.g., 1.5V, 1.8V, 2.5V, 3.3V, 5V, etc.). Applied across two taps of the autotransformer, the two logic signals can be superimposed to generate a composite signal (input waveform) across the input taps. The two logic signals can be tuned to generate the output waveform with the desired frequency content. In particular, the logic signals can be tuned to reduce the energy level at resonance in the transformer, which dissipates as lost power in the transformer rather than being output to the electrode as a stimulation signal. In some examples, the output waveform can be a sine wave. FIGS. 11A-11B illustrate exemplary logic signals and composite signals according to examples of the disclosure. FIG. 11A illustrates two logic signals 1100 and 1102, each including two voltage levels (e.g., 0V and 3.3V), which can be generated by the logic circuits 806. A positive logic signal can be applied to a first input tap (positive terminal) and a negative logic signal (inversion of the show logic signal) can be applied to a second input tap (negative terminal) which can generate composite input waveforms with three voltage levels and up to twice the magnitude of each individual logic signal at the input.

FIG. 11B illustrates exemplary composite signals that can be generated across the input of the autotransformer. In some examples, the composite signal can be a pulse waveform of simple pulses as illustrated by composite signal 1110. In some examples, additional pulses can be added to the basic waveforms to reduce harmonic content in the output waveform and to reduce power dissipation at resonance within the magnetic. For example, composite signal 1112 includes one additional pulse per edge before and after each of the simple pulses of composite signal 1110 and composite signal 1114 includes two additional pulses per edge before and after each of the simple pulses of composite signal 1110. The number, width and position of these harmonic cancellation pulses can be determined based on the system characteristics and the desired output frequency and amplitude. In some examples, simple pulses as illustrated in composite signal 1110 may be sufficient when operating the stylus at a higher frequency, but additional pulses illustrated in composite signals 1112 and 1114 can added as when operating at a lower frequency to reduce the impact of harmonics. Adding pulses can mitigate more harmonics (which can be important at lower frequencies of operation), but transitions in the waveform can cost extra energy. In some examples, composite signal 1110 can be a three-step waveform with a duty cycle $2\pi/3$ to remove triplin harmonics ($3^{rd}$ harmonic, $9^{th}$ harmonic, etc.). However, because the magnetic drive system behavior may be highly non-linear, evaluating the number, width and placement of pulses in the composite waveform can be difficult using mathematical techniques alone (though mathematic techniques can provide a general idea of a waveform at a desired frequency and eliminating desired harmonics). As described in more detail below, in some examples, various waveforms including different numbers, widths and placements of pulses can be generated to determine a class of waveforms meeting system requirements.

Figure 12:
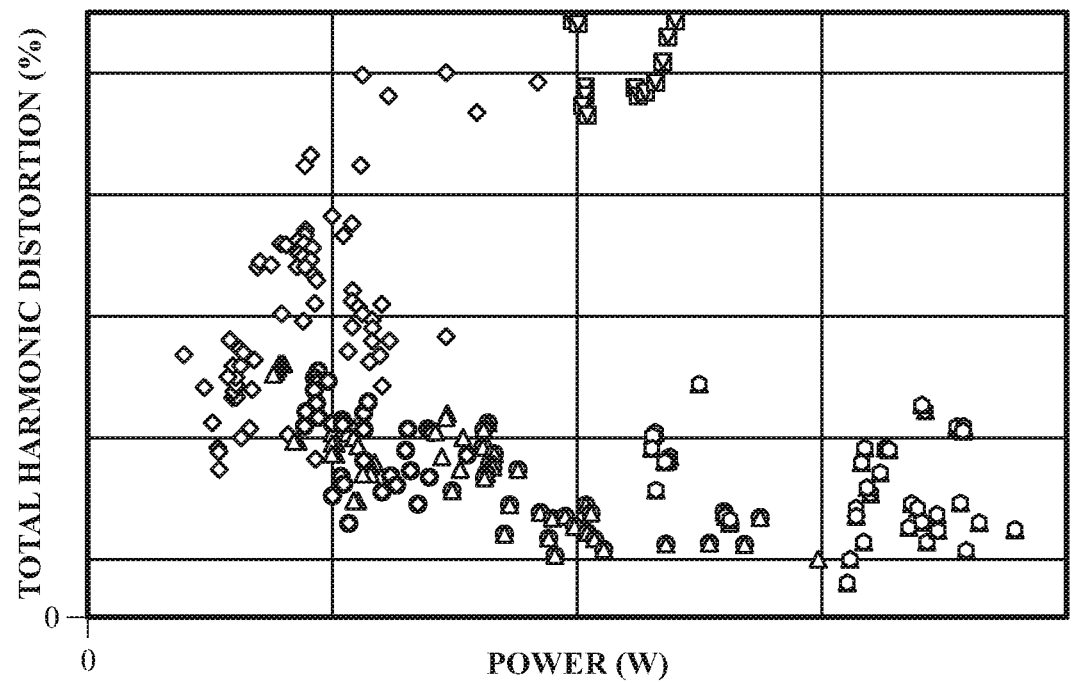
FIG. 12 illustrates a plot of total harmonic distortion versus power dissipation according to examples of the disclosure.

For example, in an active stylus application, designing the composite signals can require satisfying two conflicting requirements: total harmonic distortion and power dissipation. In particular, to keep the stimulation signal of the stylus relatively clean, a total harmonic distortion can be below a threshold amount (e.g., 1%, 5%, 10%, 20%). Additionally, as discussed herein, reducing power can improve performance of the stylus. Adding additional pulses to the input waveform can reduce harmonic content, which in turn can reduce the power dissipated in the transformer at resonance. However, adding additional pulses can require additional switching of the logic states, and the switching of logic states also dissipates power. FIG. 12 illustrates a plot of total harmonic distortion versus power dissipation according to examples of the disclosure. Each data point illustrated in the plot shows a total harmonic distortion and power dissipation for a given input waveform (e.g., varying the number, width and location of pulses) and frequency. Data points of the same style illustrated in FIG. 12 correspond to the same frequency. To improve the performance of the stylus drive system, input waveforms can be chosen to meet the total harmonic power distortion requirements and power dissipation requirements (ideally in the lower left quadrant of the plot). In some examples, the input waveforms can be selected to minimize power at a defined maximum harmonic distortion threshold.

Figure 13:
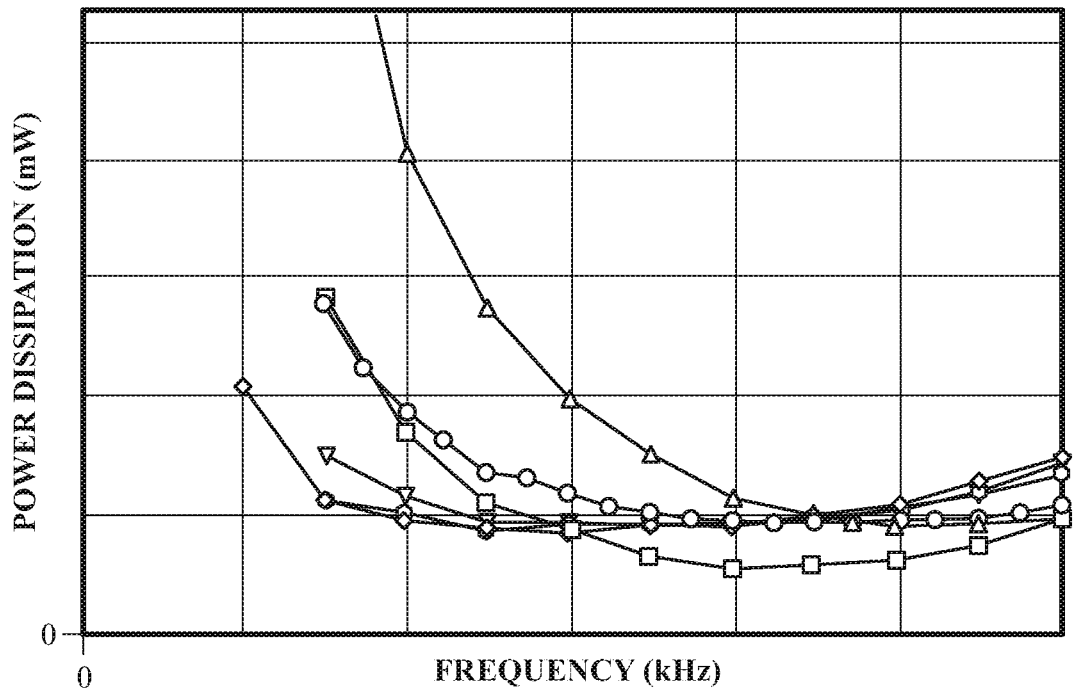
FIG. 13 illustrates a plot of power dissipation versus frequency according to examples of the disclosure.

Additionally, a power efficient drive system for a stylus can be improved by extending the power dissipation across multiple operating frequencies, especially high frequencies. As mentioned above, the stylus stimulation frequency can be provided by and/or adjusted by the touch-sensing device (e.g., to avoid noisy frequencies, to avoid interfering with the passive touch sensing system), and therefore power efficiency across a broad frequency range can improve performance. FIG. 13 illustrates a plot of power dissipation versus frequency according to examples of the disclosure. Each curve corresponds to a given input waveform applied to a specific transformer design across various frequencies. The input waveform applied at each of the various frequencies can be optimized as discussed above by adjusting the number, width and placement of pulses. To improve the performance of the stylus magnetic drive system, input waveforms can be chosen that can achieve a desired power dissipation across the desired range of frequencies.

As discussed herein, in some examples, a stable stimulation output voltage can be required for sensing performance of a system using an active stylus. For example, some systems may require the output voltage remain within a threshold (e.g., 1%, 5%, 10%) of the desired output voltage amplitude to avoid false positive touches or false negative touches when detected by a touch-sensitive device. Referring back to FIG. 8A, in some examples, output stability can be achieved with a sampling circuit 810 that can sample the output of transformer circuit and a processor 808 that can adjust the logic signals applied to the transformer circuit (e.g., by adjusting the voltage of the logic signals or the pulse width). In some examples, the sampling circuit can include an analog-to-digital converter (ADC), which can sample the output at a high speed. However, because output drift is a relatively slow process, in some examples, the sampling circuit can be more power efficient by sampling the output signal at lower speed. For example, the sampling circuit can further include a DC-AC converter circuit (e.g., using a rectifier and RC filter circuitry) to convert the high frequency AC stimulation signal into a DC signal that can be sampled by an ADC operating at a lower speed (e.g., once per stylus scan period). Additionally, in some examples, the logic signals can be adjusted based on the sample (or samples) during periods when the stylus is not generating stimulation signals (e.g., once per stylus scan period).

Figure 15:
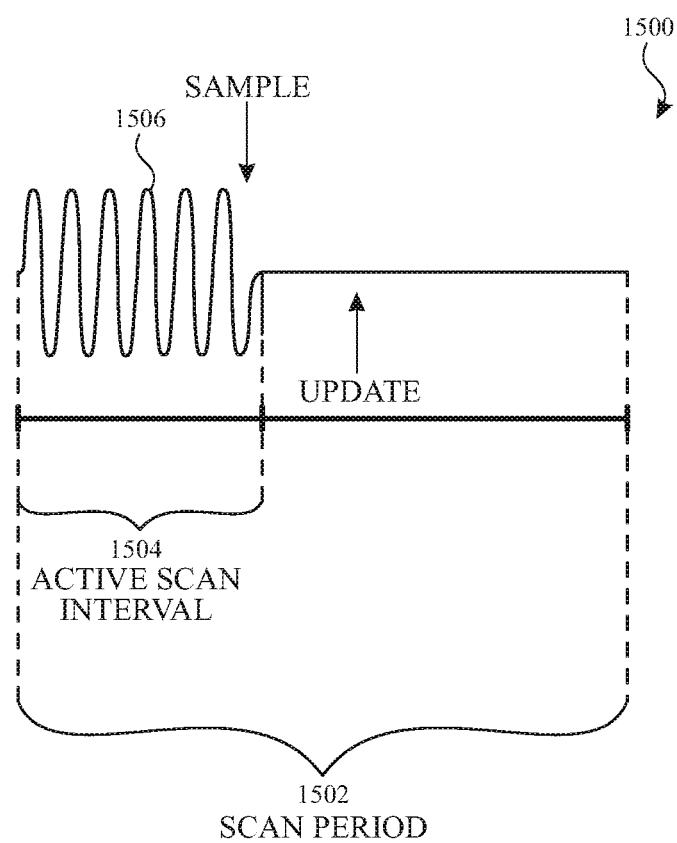
FIG. 15 illustrates an example scan period for an active stylus according to examples of the disclosure.

FIG. 15 illustrates an example scan period for an active stylus according to examples of the disclosure. Rather than continuously generating stylus stimulation signals, a stylus scan period can include one or more active scan intervals and one or more inactive intervals. For example, FIG. 15 illustrates a stylus scan period 1502 can include an active scan interval 1504 during which time stylus stimulation signal 1506 can be generated, and a stylus inactive interval. The scan period 1502 can be initiated, for example, based on synchronization with stylus scan events by the touch sensor panel, or when force is applied to the stylus tip. The stylus stimulation signal 1506 can be sampled by the sampling circuit during the active scan interval 1504. For example, the sampling can take place after the stylus stimulation signal stabilizes at a DC value (e.g., at the end of the active scan interval). The logic signals can then be updated during the inactive interval of the scan period 1502, such that switching of the stylus input waveform during an active scan interval does not introduce noise and distortion in the output waveform. Although FIG. 15 illustrates sampling and updating each scan period 1502, the stabilization process can be performed periodically (e.g., once per minute, once per hour, once per day, once per month, etc.), intermittently, or according to one or more detected triggering conditions (e.g., when the stylus is paired or repaired, when the stylus frequency changes, based on a temperature sensor).

Figure 14:
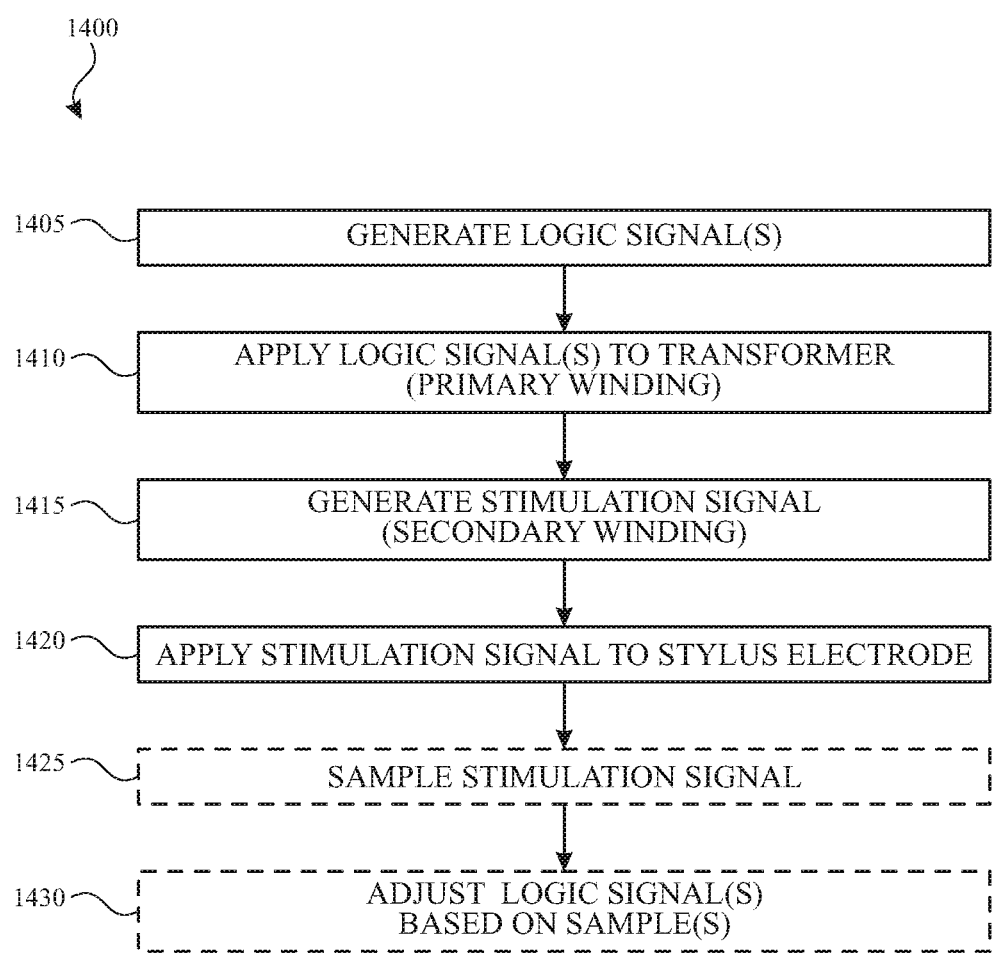
FIG. 14 illustrates an exemplary process for operating an active stylus including a magnetic according to examples of the disclosure.

FIG. 14 illustrates an exemplary process 1400 for operating an active stylus including a magnetic according to examples of the disclosure. At 1405, the stylus circuitry can generate one or more logic signals. As described herein, the one or more logic signals can be generated by one or more logic circuits (e.g., provided by a processor from a memory/storage device). The one or more logic signals can include a plurality of pulses tuned to reduce power consumption and control the frequency content of the output. At 1410, the generated one or more logic signals can be applied to a transformer circuit. As described herein, for a two-winding transformer, the one or more logic signals can be applied to the primary winding and for a single-winding transformer, the one or more logic signals can be applied to the input taps of the primary side. At 1415, the transformer can generate a stimulation signal as a result of the applied logic signal. The stimulation signal can be generated across the secondary winding for a two-winding transformer or output from a third, output tap of a single-winding transformer. In some examples, the stimulation signal can be a sine wave. At 1420, the stimulation signal can be applied to a stylus electrode.

Additionally, as described herein, process 1400 can optionally include output amplitude stabilization of the stimulation signal. At 1425, the stimulation signal can be sampled. As described herein, sampling the output can be performed using an ADC (and optionally an AC-DC converter), for example. At 1430, the one or more logic signals can be adjusted based on the one or more samples. In some the sampling and adjusting can be performed using a servo loop to maintain the desired stimulation signal output voltage amplitude level. In some examples, the sample can be taken once per active interval (for each scan period during which the output stabilization is applied) and updated during an inactive interval of the scan period.

It should be understood that although process 1400 describes generation of one stimulation signal for one stylus electrode, the process can be repeated for stimulation signals for additional stylus electrodes. In some examples, the stimulation of multiple electrodes can be time-multiplexed and in some examples the stimulation of multiple electrodes can be partially or fully simultaneous (requiring additional circuitry).

It should be noted that although often described in the context of a stylus, the examples herein can be applied to other input devices interacting with touch-sensitive surfaces. Additionally, although often described with regard to a touch screen, the input devices can be used with touch-sensitive devices that do not include a touch screen.

Therefore, according to the above, some examples of the disclosure are directed to an input device (e.g., active stylus). The active stylus can comprise: a first electrode at a distal end of the active stylus, a first transformer circuit coupled to the first electrode (e.g., configured as an autotransformer), and control circuitry coupled to the first transformer circuit. The control circuitry can be capable of applying one or more first signals to the first transformer circuit to generate one or more second signals at the first electrode. Additionally or alternatively to one or more of the examples disclosed above, in some examples, the active stylus can further comprise a second electrode at the distal end of the active stylus and a second transformer circuit coupled to the second electrode and coupled to the control circuitry. The control circuitry can be further capable of applying one or more third signals to the second transformer circuit to generate one or more fourth signals at the second electrode. Additionally or alternatively to one or more of the examples disclosed above, in some examples, the one or more first signals can comprise a first logic signal applied to a first tap of the first transformer circuit and a second logic signal applied to a second tap of the first transformer circuit. Additionally or alternatively to one or more of the examples disclosed above, in some examples, the first logic signal and second logic signal can be tuned to reduce power consumption of the active stylus. Additionally or alternatively to one or more of the examples disclosed above, in some examples, the control circuitry can be further capable of adjusting a voltage characteristic of the one or more first signals to stabilize a voltage characteristic of the one or more second signals. Additionally or alternatively to one or more of the examples disclosed above, in some examples, the control circuitry can comprise one or more logic circuits configured to generate the one or more first signals. Additionally or alternatively to one or more of the examples disclosed above, in some examples, the control circuitry can comprise a regulator circuit configured to supply a voltage rail for the one or more logic circuits. Additionally or alternatively to one or more of the examples disclosed above, in some examples, the control circuitry can further comprise: a processing circuit configured to adjust an output of the regulator circuit based on the one or more second signals. Additionally or alternatively to one or more of the examples disclosed above, in some examples, the control circuitry further can comprise an analog-to-digital circuit configured to sample the one or more second signals. Additionally or alternatively to one or more of the examples disclosed above, in some examples, the control circuitry can further comprise a circuit configured to convert the one or more second signals from an alternative current to a direct current signal before sampling by the analog-to-digital circuit.

Some examples of the disclosure are directed to a method for operating an active stylus capable of stimulating a touch-sensitive device. The method can comprise: generating, at control circuitry in the active stylus, one or more logic signals; applying the one or more logic signals to a primary side of an autotransformer circuit; generating, at an output of a secondary side of the autotransformer circuit, a stimulation signal; and applying the stimulation signal to an electrode at a distal end of the active stylus. Additionally or alternatively to one or more of the examples disclosed above, in some examples, the method can further comprise: sampling the stimulation signal; and adjusting a voltage level of the one or more logic signals in accordance with a sample of the stimulation signal. Additionally or alternatively to one or more of the examples disclosed above, in some examples, the stimulation signal can be sampled once per scan period during an active scan interval. Additionally or alternatively to one or more of the examples disclosed above, in some examples, the voltage level of the one or more logic signals can be adjusted once per scan period during an inactive scan interval. Additionally or alternatively to one or more of the examples disclosed above, in some examples, the one or more logic signals can include a first logic signal applied to a first tap of the autotransformer circuit and a second logic signal applied to a second tap of the autotransformer circuit.

Some examples of the disclosure are directed to a non-transitory computer-readable medium including instructions, which when executed by an active stylus capable of stimulating a touch sensitive device, can cause the active stylus to: generate, at control circuitry in the active stylus, one or more logic signals; apply the one or more logic signals to a primary side of an autotransformer circuit; generate, at an output of a secondary side of the autotransformer circuit, a stimulation signal; and apply the stimulation signal to an electrode at a distal end of the active stylus. Additionally or alternatively to one or more of the examples disclosed above, in some examples, the instructions, when executed, can further cause the active stylus to: sample the stimulation signal; and adjust a voltage level of the one or more logic signals in accordance with a sample of the stimulation signal. Additionally or alternatively to one or more of the examples disclosed above, in some examples, the stimulation signal can be sampled once per scan period during an active scan interval. Additionally or alternatively to one or more of the examples disclosed above, in some examples, the voltage level of the one or more logic signals can be adjusted once per scan period during an inactive scan interval. Additionally or alternatively to one or more of the examples disclosed above, in some examples, the one or more logic signals can include a first logic signal applied to a first tap of the autotransformer circuit and a second logic signal applied to a second tap of the autotransformer circuit.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An active stylus, comprising:
   a first electrode at a distal end of the active stylus;
   a first transformer circuit coupled to the first electrode, the transformer configured as an autotransformer; and
   control circuitry coupled to the first transformer circuit configured to apply one or more first signals to the first transformer circuit to generate one or more second signals at the first electrode, wherein the one or more first signals comprise a first logic signal applied to a first tap of the first transformer circuit and a second logic signal applied to a second tap of the first transformer circuit, and wherein the first logic signal and the second logic signal are superimposed to generate a composite signal across the first tap and the second tap of the first transformer circuit.

2. The active stylus of claim 1, further comprising:
   a second electrode at the distal end of the active stylus; and
   a second transformer circuit coupled to the second electrode and coupled to the control circuitry;
   wherein the control circuitry is further configured to apply one or more third signals to the second transformer circuit to generate one or more fourth signals at the second electrode.

3. The active stylus of claim 1, wherein the first logic signal and second logic signal are tuned to reduce power consumption of the active stylus.

4. The active stylus of claim 1, wherein the control circuitry is further configured to adjust a voltage characteristic of the one or more first signals to stabilize a voltage characteristic of the one or more second signals.

5. The active stylus of claim 1, wherein the control circuitry comprises:
one or more logic circuits configured to generate the one or more first signals.

6. The active stylus of claim 5, wherein the control circuitry comprises:
a regulator circuit configured to supply a voltage rail for the one or more logic circuits.

7. The active stylus of claim 6, wherein the control circuitry further comprises:
a processing circuit configured to adjust an output of the regulator circuit based on the one or more second signals.

8. The active stylus of claim 7, wherein the control circuitry further comprises:
an analog-to-digital circuit configured to sample the one or more second signals.

9. The active stylus of claim 8, wherein the control circuitry further comprises:
a circuit configured to convert the one or more second signals from an alternative current to a direct current signal before sampling by the analog-to-digital circuit.

10. The active stylus of claim 1, wherein the first logic signal comprises a pulse waveform with two voltage levels, the second logic signal comprises a pulse waveform with two voltage levels, and the composite signal comprises a pulse waveform with three voltage levels, and wherein the one or more second signals at the first electrode comprise a sine wave.

11. A method for operating an active stylus capable of stimulating a touch-sensitive device, the method comprising:
generating, at control circuitry in the active stylus, one or more logic signals;
applying the one or more logic signals to a primary side of an autotransformer circuit, wherein the one or more logic signals comprise a first logic signal applied to a first tap of the primary side of the autotransformer circuit and a second logic signal applied to a second tap of the prima side of the autotransformer circuit, and wherein the first logic signal and the second logic signal are superimposed to generate a composite signal across the first tap and the second tap of the autotransformer circuit;
generating, at an output of a secondary side of the autotransformer circuit, a stimulation signal; and
applying the stimulation signal to an electrode at a distal end of the active stylus.

12. The method of claim 11, further comprising:
sampling the stimulation signal; and
adjusting a voltage level of the one or more logic signals in accordance with a sample of the stimulation signal.

13. The method of claim 12, wherein the stimulation signal is sampled once per scan period during an active scan interval.

14. The method of claim 12, wherein the voltage level of the one or more logic signals is adjusted once per scan period during an inactive scan interval.

15. The method of claim 11, wherein the first logic signal comprises a pulse waveform with two voltage levels, the second logic signal comprises a pulse waveform with two voltage levels, and the composite signal comprises a pulse waveform with three voltage levels, and wherein the stimulation signal at the electrode at the distal end of the active stylus comprises a sine wave.

16. A non-transitory computer readable storage medium having stored therein instructions, which when executed by an active stylus capable of stimulating a touch sensitive device, cause the active stylus to:
generate, at control circuitry in the active stylus, one or more logic signals;
apply the one or more logic signals to a primary side of an autotransformer circuit, wherein the one or more logic signals comprise a first logic signal applied to a first tap of the primary side of the autotransformer circuit and a second logic signal applied to a second tap of the primary side of the autotransformer circuit, and wherein the first logic signal and the second logic signal are superimposed to generate a composite signal across the first tap and the second tap of the autotransformer circuit;
generate, at an output of a secondary side of the autotransformer circuit, a stimulation signal; and
apply the stimulation signal to an electrode at a distal end of the active stylus.

17. The non-transitory computer readable storage medium of claim 16, the instructions, when executed, further causing the active stylus to:
sample the stimulation signal; and
adjust a voltage level of the one or more logic signals in accordance with a sample of the stimulation signal.

18. The non-transitory computer readable storage medium of claim 17, wherein the stimulation signal is sampled once per scan period during an active scan interval.

19. The non-transitory computer readable storage medium of claim 17, wherein the voltage level of the one or more logic signals is adjusted once per scan period during an inactive scan interval.

20. The non-transitory computer readable storage medium of claim 16, wherein the first logic signal comprises a pulse waveform with two voltage levels, the second logic signal comprises a pulse waveform with two voltage levels, and the composite signal comprises a pulse waveform with three voltage levels, and wherein the stimulation signal comprises a sine wave.

* * * * *

UNITED STATES PATENT AND TRADEMARK OFFICE
CERTIFICATE OF CORRECTION

PATENT NO. : 10,585,502 B2
APPLICATION NO. : 15/680088
DATED : March 10, 2020
INVENTOR(S) : Michael Nussbaum et al.

Page 1 of 1

It is certified that error appears in the above-identified patent and that said Letters Patent is hereby corrected as shown below:

In the Claims

In Column 23, Line 42, in Claim 11, delete "prima" and insert -- primary --.

Signed and Sealed this
Twenty-eighth Day of July, 2020

Andrei Iancu
*Director of the United States Patent and Trademark Office*